(12) United States Patent
Karlsson

(10) Patent No.: US 10,583,483 B2
(45) Date of Patent: Mar. 10, 2020

(54) METHOD AND APPARATUS FOR PRODUCING A THREE-DIMENSIONAL ARTICLE

(71) Applicant: Arcam AB, Moelndal (SE)

(72) Inventor: Kristofer Karlsson, Kungsbacka (SE)

(73) Assignee: Arcam AB, Moelndal (SE)

( * ) Notice: Subject to any disclaimer, the term of this patent is extended or adjusted under 35 U.S.C. 154(b) by 450 days.

(21) Appl. No.: 15/268,865

(22) Filed: Sep. 19, 2016

(65) Prior Publication Data
US 2017/0106570 A1  Apr. 20, 2017

Related U.S. Application Data

(60) Provisional application No. 62/241,950, filed on Oct. 15, 2015.

(51) Int. Cl.
*B29C 67/00* (2017.01)
*B22F 3/105* (2006.01)
(Continued)

(52) U.S. Cl.
CPC ........ *B22F 3/1055* (2013.01); *B23K 15/0086* (2013.01); *B23K 15/02* (2013.01);
(Continued)

(58) Field of Classification Search
CPC ..... B29C 64/20; B29C 64/205; B29C 64/209; B29C 64/214; B29C 64/218;
(Continued)

(56) References Cited

U.S. PATENT DOCUMENTS 2,264,968 A   12/1941  De Forest
2,323,715 A    7/1943  Kuehni
(Continued)

FOREIGN PATENT DOCUMENTS

CA   2860188 A1   6/2006
CN   101607311 A  12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Joseph S Del Sole
*Assistant Examiner* — Lawrence D. Hohenbrink, Jr.
(74) *Attorney, Agent, or Firm* — Dinsmore & Shohl LLP

(57) ABSTRACT

A pivoted powder pushing device is provided, comprising a first portion and a contact member, wherein: the contact member is configured to operatively engage a grip arm of the distribution member when the distribution member is positioned at least in part above the base surface, and the first portion is moved via the engagement of the grip arm and the contact member in a first direction opposite a direction of travel of the distribution member, such that the first portion of said pivoted powder pushing device passes under said distribution member. An associated apparatus, method, and computer program product are also provided.

18 Claims, 8 Drawing Sheets

(51) Int. Cl.

| | |
|---|---|
| *B33Y 10/00* | (2015.01) |
| *B33Y 30/00* | (2015.01) |
| *B23K 15/00* | (2006.01) |
| *B23K 15/02* | (2006.01) |
| *B23K 26/342* | (2014.01) |
| *B23K 26/70* | (2014.01) |
| *B29C 64/153* | (2017.01) |
| *B29C 64/20* | (2017.01) |
| B29C 64/218 | (2017.01) |
| B29C 64/205 | (2017.01) |
| B29C 64/321 | (2017.01) |
| B29C 64/329 | (2017.01) |
| B29C 64/214 | (2017.01) |
| B29C 64/255 | (2017.01) |
| B29C 64/209 | (2017.01) |
| B29C 64/259 | (2017.01) |
| B29L 9/00 | (2006.01) |

(52) U.S. Cl.
CPC ............ *B23K 26/342* (2015.10); *B23K 26/70* (2015.10); *B29C 64/153* (2017.08); *B29C 64/20* (2017.08); *B33Y 10/00* (2014.12); *B33Y 30/00* (2014.12); *B22F 3/105* (2013.01); *B22F 2003/1056* (2013.01); *B22F 2003/1057* (2013.01); *B22F 2003/1059* (2013.01); *B22F 2999/00* (2013.01); *B29C 64/205* (2017.08); *B29C 64/209* (2017.08); *B29C 64/214* (2017.08); *B29C 64/218* (2017.08); *B29C 64/255* (2017.08); *B29C 64/259* (2017.08); *B29C 64/321* (2017.08); *B29C 64/329* (2017.08); *B29L 2009/00* (2013.01); *Y02P 10/295* (2015.11)

(58) Field of Classification Search
CPC ... B29C 64/255; B29C 64/321; B29C 64/329; B29C 64/153; B29C 64/259; B33Y 10/00; B33Y 30/00; Y02P 10/295; B22F 3/105; B22F 3/1055; B22F 2003/1056; B22F 2003/1057; B22F 2003/1059
USPC .......................................................... 425/375
See application file for complete search history.

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |

(56) References Cited

U.S. PATENT DOCUMENTS

| | | |
|---|---|---|
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1* | 12/2007 | Perret .............. B22F 3/1055 427/427.3 |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0263209 A1 | 9/2014 | Burris et al. |
| 2014/0265045 A1 | 9/2014 | Cullen et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0348969 A1 | 11/2014 | Scott |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0224712 A1* | 8/2015 | Tjellesen ............. B33Y 30/00 425/375 |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101635210 A | 1/2010 |
| CN | 101607311 B | 9/2011 |
| CN | 203509463 U | 4/2014 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |

(56) References Cited

FOREIGN PATENT DOCUMENTS

| | | |
|---|---|---|
| JP | 2009006509 A | 1/2009 |
| SE | 524467 C2 | 8/2004 |
| WO | WO 1993/008928 | 5/1993 |
| WO | WO 1996/012607 A1 | 5/1996 |
| WO | WO 1997/037523 A2 | 10/1997 |
| WO | WO 2001/081031 A1 | 11/2001 |
| WO | WO 2001/085386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, T., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.

Gibson, D.W., et al., "Additive Manufacturing Technologies: Rapid Prototyping to Direct Digital Manufacturing", 2010, pp. 126-129, Springer, New York.

Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

Written Opinion of the International Search Authority and International Search Report relating to PCT/EP2016/072424 filed Sep. 21, 2016; dated Dec. 22, 2016.

Written Opinion of the International Search Authority and International Search Report relating to PCT/EP2016/072434 filed Sep. 21, 2016; dated Dec. 23, 2016.

\* cited by examiner

METHOD AND APPARATUS FOR PRODUCING A THREE-DIMENSIONAL ARTICLE

CROSS-REFERENCE TO RELATED APPLICATIONS

This application claims priority to and the benefit of U.S. Provisional Patent Application Ser. No. 62/241,950, filed Oct. 15, 2015; the contents of which as are hereby incorporated by reference in their entirety.

BACKGROUND

Technical Field

This invention relates to a method and an apparatus for producing a three-dimensional object layer by layer using a powdery material which can be solidified by irradiating it with an energy beam. In particular, the invention relates to the layer-wise application of powder.

Related Art

Equipment for producing a three-dimensional object layer by layer using a powdery material which can be solidified by irradiating it with electromagnetic radiation or an electron beam are known from e.g. U.S. Pat. Nos. 4,863,538, 5,647,931 and SE524467. Such equipment include for instance a supply of powder, means for applying a layer of powder on a working area, and means for directing the beam over the working area. The powder sinters or melts and solidifies as the beam moves over the working area. For product quality reasons it is important that the powder is evenly distributed over the working area and that the layer thickness is well-defined and corresponds to a pre-determined value. Further, it is advantageous that the layer is quickly applied in order to keep the production rate as high as possible.

Traditional powder application means generally includes a feeding member and a distribution member where the former transfers a certain quantity of powder from the supply of powder to the distribution member, which in turn distributes the powder over the working area.

The conditions under which the powder application means work are rough; the temperature is high, powder particles find their way into openings and slits, evaporated powder material condensate and form coatings and the like.

JP 2003245981 discloses a powder application system where a supply of powder is stored onto a feeding member in the form of a height-adjustable plate at the side of a working area. Powder is fed to a distributing rake by a) moving the rake sideways away from the working area and over the supply of powder, b) raising the powder supply plate so that a portion of powder becomes positioned above a lower side of the rake, and c) moving the rake towards and across the powder supply so as to transfer the portion of powder towards the working area. A similar system is disclosed in US 2004/0084814. A drawback of such systems is that it is relatively space consuming.

WO 2006/121374 discloses another powder application system wherein the powder supply is arranged in an open manner such as to form an angle of repose on the side of the powder supply facing the working area. A distribution rake is arranged to be moveable towards and a certain distance into the powder supply such as to bring about a transfer of a portion of powder that flows over the rake from the far side of the distribution rake to the side facing the working area. In a second step, the distribution rake is moved towards and across the working area as to distribute the portion of powder onto the working area. An advantage of this system is that no mechanically operated feeding member is required for feeding powder to the distribution rake.

Problems may arise with the device disclosed in WO 2006/121374 when using certain types of powder that do not flow very well. For instance, powder may stay on top of the rake when the rake is moved into the powder supply and the amount of powder in the portion transferred over the rake may vary.

In WO 2010/095987 it is disclosed yet another powder application system wherein a base surface for supporting supply of powder from a powder storage unit is resilient. A drawback with this design is that the rake has to move into the powder supply which creates unnecessary force on the powder distributor. Another problem is that powder may stick on the back side of the powder distributor which may fall off on a newly distributed powder layer and thereby deteriorate its surface finish.

Thus, there is still a need for improvements in this field.

BRIEF SUMMARY

An object of this invention is to provide equipment for layer-wise production of three-dimensional objects, which equipment exhibits improved powder application properties compared to conventional equipment. This object is achieved by an apparatus and method defined by the technical features contained in independent claims. The dependent claims contain advantageous embodiments, further developments and variants of the invention.

In a first aspect of the present invention it is provided an apparatus (100) for producing a three-dimensional object layer by layer using a powdery material which can be solidified by irradiating it with an energy beam, such as electromagnetic radiation or an electron beam, the apparatus comprising: a working area onto which layers of powdery material are to be placed; a powder storage unit comprising an opening spaced apart from a base surface, where the base surface is supporting a supply of powder in the powder storage unit; and a powder distribution member; wherein the base surface extends along a side of the working area, wherein the distribution member extends in a direction along the base surface and the side of the working area and is arranged to be moveable in a plane above, and substantially parallel to the working area, a pivoted powder pushing device for bringing a portion of powder from the base surface to a position between the distribution member and the working area, the distribution member further being arranged to be moveable towards and across the working area so as to distribute the portion of powder onto the working area, wherein a first portion of the pivoted powder pushing device is movable under the distribution member.

Compared to the devices in prior art design the inventive design provides for a better control of the size of the powder portion being transferred, in particular when using powder with poor flowability. One reason for this improved control is that the transfer of powder below the distribution member is forced with a pivoted powder pushing device, and thereby decouples the physical contact of the powder portion and the powder distributor until the powder portion is actually going to be formed as a layer. Another reason is that the inventive apparatus is less sensitive to the type of powder to be provided in front of the powder distributor since it is more or less independent of the flowability condition of the powder. This means that the size of the powder portion transferred can be controlled in a more exact manner. Another advantage of the present invention is that no powder sensor may be needed to be used in order to measure the amount of powder to be distributed on the working area. Still another advantage of the present invention is that more or less any design of the rake may be used.

In various example embodiments of the present invention the pivoted powder pushing device is mechanically actuated by the distribution member. An exemplary advantage of at least this embodiment is that it is simple end robust.

In various example embodiments of the present invention the pivoted powder pushing device is electrically actuated and controlled by a control unit. An exemplary advantage of at least this embodiment is that it the design may be very compact.

In various example embodiments of the present invention a pivot axle for the pivoted powder pushing device is provided above the base surface. An exemplary advantage of at least this embodiment is that it provides for a simple solution for allowing the rake to be movable above the first portion of the pivoted powder pushing device.

In various example embodiments of the present invention the pivoted powder pushing device interrupts powder flow from the powder storage unit onto the base surface during a portion of its pivoted stroke. An exemplary advantage of at least this embodiment is that powder flow from the powder storage unit may be regulated by the pivoted powder pushing device.

In various example embodiments of the present invention the apparatus comprises a first and a second powder storage unit comprising a first base surface and a second base surface respectively for supporting supply of powder from the first and second powder storage units, the first and second powder storage units are arranged on opposite ends of the working area, wherein above and spaced apart from a portion of the base surface it is provided a net having a surface essentially in parallel with the working area, which net is used for filtering surplus powder after a final powder distribution. An exemplary advantage of at least this embodiment is that surplus powder after a final powder distribution may be reused in a later powder distribution. This means that there is no or very little spill of powder material during the additive manufacturing process.

In various example embodiments of the present invention the powder supply base surface is having a curved shape. An exemplary advantage of at least this embodiment is that this curved surface may have a similar radius of curvature as the pivoted stroke of the first portion of the pivoted powder pushing device. This means that the first portion during its stroke may be arranged at a predetermined distance from the curved surface, which in turn may improve the exactness of the amount of powder to be delivered onto the powder table, i.e., to a position between the distribution member and the working area.

In various example embodiments the working area is located on a vertically adjustable platform. An exemplary advantage of at least this embodiment is that the present invention may be suitable for any type of powder based layer by layer additive manufacturing device. The energy beam source may be one or a plurality of electron beam sources and/or one or a plurality of laser beam sources.

In another aspect of the present invention it is provided a method for producing a three-dimensional article layer by layer using a powdery material which can be solidified by irradiating it with an energy beam, such as electromagnetic radiation or an electron beam, the method comprising: providing a powder storage unit comprising an opening spaced apart from a base surface, where the base surface is supporting a supply of powder in the powder storage unit; bringing a predetermined amount of powder from the base surface to a position between the distribution member and the working area with a pivoted powder pushing device, moving the distribution member towards and across the working area so as to distribute the portion of powder onto the working area for forming a layer of powder material, wherein a portion of the pivoted powder pushing device is movable under the distribution member.

In yet another aspect of the present invention, a computer program product comprising at least one non-transitory computer-readable storage medium having computer-readable program code portions embodied therein. The computer-readable program code portions comprises at least one executable portion configured for: providing a powder storage unit comprising an opening spaced apart from a base surface, where the base surface is supporting a supply of powder in the powder storage unit; bringing a predetermined amount of powder from the base surface to a position between the distribution member and the working area with a pivoted powder pushing device; and moving the distribution member towards and across the working area so as to distribute the portion of powder onto the working area for forming a layer of powder material, wherein a portion of the pivoted powder pushing device is movable under the distribution member.

In yet another aspect of the present invention, a pivoted powder pushing device (125) is provided for bringing a portion of powder from a base surface (130) of an apparatus (100) for producing a three-dimensional object layer by layer using a powdery material which can be solidified by irradiation thereof with an energy beam and to a position between a distribution member (185) and a working area (190) of the apparatus. The pivoted powder pushing device (125) comprises: a first portion (170), and a contact member (154), wherein: the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of the pivoted powder pushing device (125) passes under the distribution member (185).

In yet another aspect of the present invention, and apparatus (100) is provided for producing a three-dimensional object layer by layer using a powdery material which can be solidified by irradiating it with an energy beam, such as electromagnetic radiation or an electron beam. The apparatus (100) comprises: a pivoted powder pushing device (125) for bringing a portion of powder from a base surface (130) of the apparatus to a position between a distribution member (185) of the apparatus and a working area (190) of the apparatus, wherein: the pivoted powder pushing device (125) comprises a first portion (170), and a contact member (154), the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of the pivoted powder pushing device (125) passes under the distribution member (185).

In yet another aspect of the present invention, a computer-implemented method is provided for producing a three-dimensional article layer by layer using a powdery material which can be solidified by irradiating it with an energy beam, such as electromagnetic radiation or an electron beam. The method comprises the steps of: providing a powder storage unit comprising an opening spaced apart from a base surface, where the base surface is supporting a supply of powder in the powder storage unit; bringing a predetermined amount of powder from the base surface to a position between the distribution member and the working area with a pivoted powder pushing device; and moving the distribution member towards and across the working area so as to distribute the portion of powder onto the working area for forming a layer of powder material, wherein: the pivoted powder pushing device (125) comprises a first portion (170), and a contact member (154), the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of the pivoted powder pushing device (125) passes under the distribution member (185).

In yet another aspect of the present invention, a computer program product comprising at least one non-transitory computer-readable storage medium having computer-readable program code portions embodied therein is provided. The computer-readable program code portions comprising at least one executable portion is configured for: providing a powder storage unit comprising an opening spaced apart from a base surface, where the base surface is supporting a supply of powder in the powder storage unit; bringing a predetermined amount of powder from the base surface to a position between the distribution member and the working area with a pivoted powder pushing device; and moving the distribution member towards and across the working area so as to distribute the portion of powder onto the working area for forming a layer of powder material, wherein: the pivoted powder pushing device (125) comprises a first portion (170), and a contact member (154), the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of the pivoted powder pushing device (125) passes under the distribution member (185).

An exemplary advantage of at least this embodiment and various other example embodiments of the inventive method is the same as the corresponding apparatus embodiments.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Figure 1A:
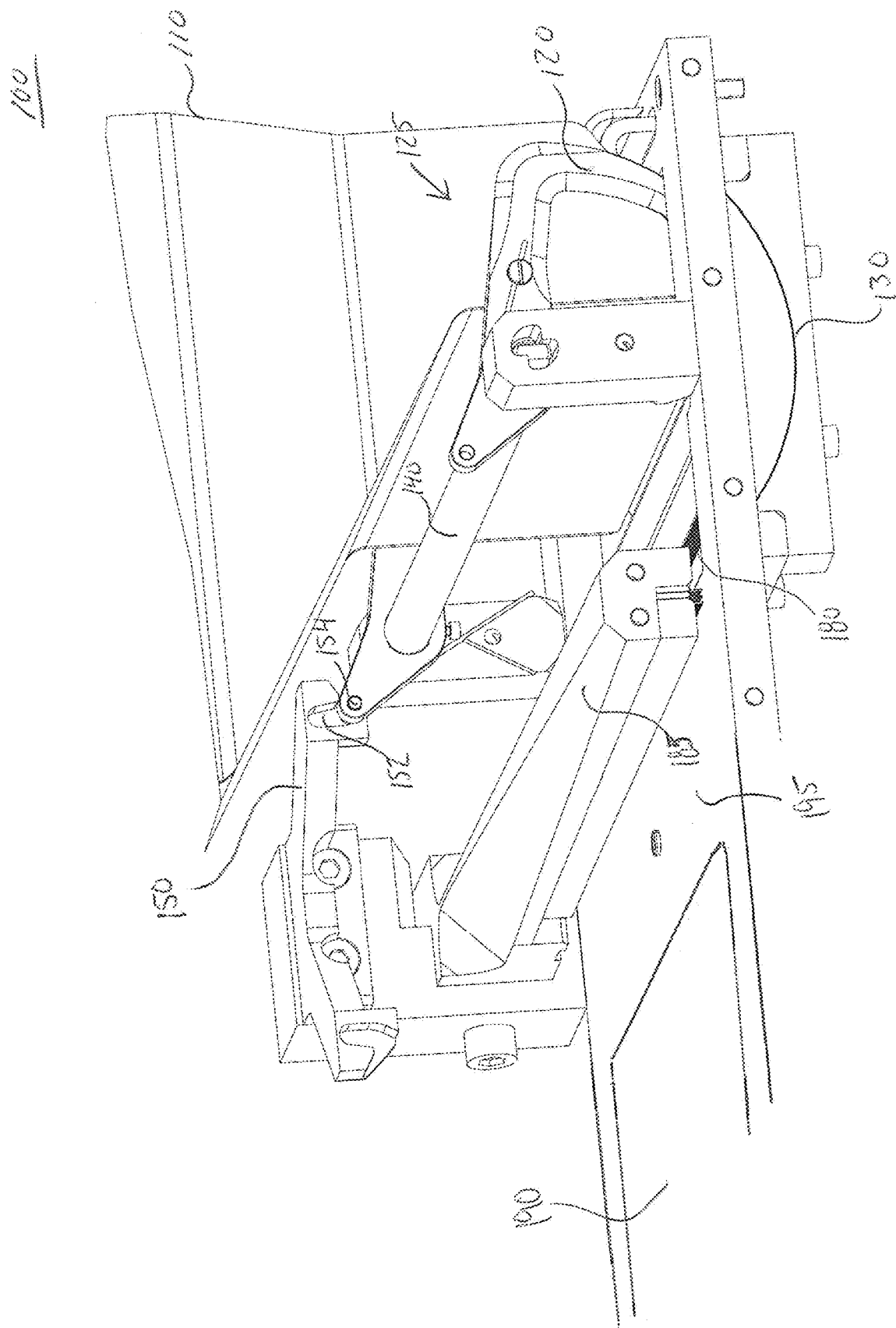
FIG. 1A depicts in a schematic front left perspective view, an example embodiment of the invention where a pivoted powder pushing element is in a first end position.

To facilitate the understanding of this invention, a number of terms are defined below. Terms defined herein have meanings as commonly understood by a person of ordinary skill in the areas relevant to the present invention.

Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

FIGS. 1A-B and 2A-B show the components and the function of a first example embodiment of the invention. As shown in these figures the inventive apparatus 100 comprises a powder application system arranged on a substantially flat working table 195, which system comprises a powder storage unit 110 arranged on one side of a working area 190 located on top of a vertically adjustable platform that fits into a cut-out in the working table 195.

The powder storage unit 110 is adapted to contain a supply of powder. A distribution member 185, here in the form of a rake, extends along the working area 190 and may be arranged by means of guides (not shown) to be moveable across the working area 190 in a direction perpendicular to its direction of extension and in a plane slightly above the working area 190.

A radiation source (not shown) is arranged in a conventional way at a distance above the working area 190, which working area 190 acts as a target area for the electromagnetic radiation or electron beam used to solidify the powder. If an electron beam is used the additive manufacturing process is thoroughly enclosed, sealed and evacuated to avoid that gas molecules interfere with the electron beam.

The powder storage unit 110, together with its corresponding powder supply, extends along a side of the working area 190 in a direction substantially parallel to the rake or powder distributor 185. The powder storage unit 110 together with a supporting base surface 130 define limiting parts of the powder storage unit 110 and keep the supply of powder in place. The supporting base surface 130 may have a curved surface with a predetermined radius of curvature. The powder storage unit 110 is arranged in an open manner by letting an opening 160 of the powder storage unit 160 at a distance above the base surface 130. This has the effect that a lower part of the supply of powder is free to at least partially fill up a volume defined by the curved base surface 130 up to a level in parallel with the working table 195. The powder storage unit 110 may be filled or refilled from above.

The function of the powder application system of the apparatus 100 will now be described. FIGS. 1A-B and 2A-B refer to an initial state with regard to the production of a three-dimensional object, i.e. the working area 190 is adjusted to a position slightly below the level of the working table 195 as to facilitate an application of the first layer of powder onto the working area 190.

Figure 1B:
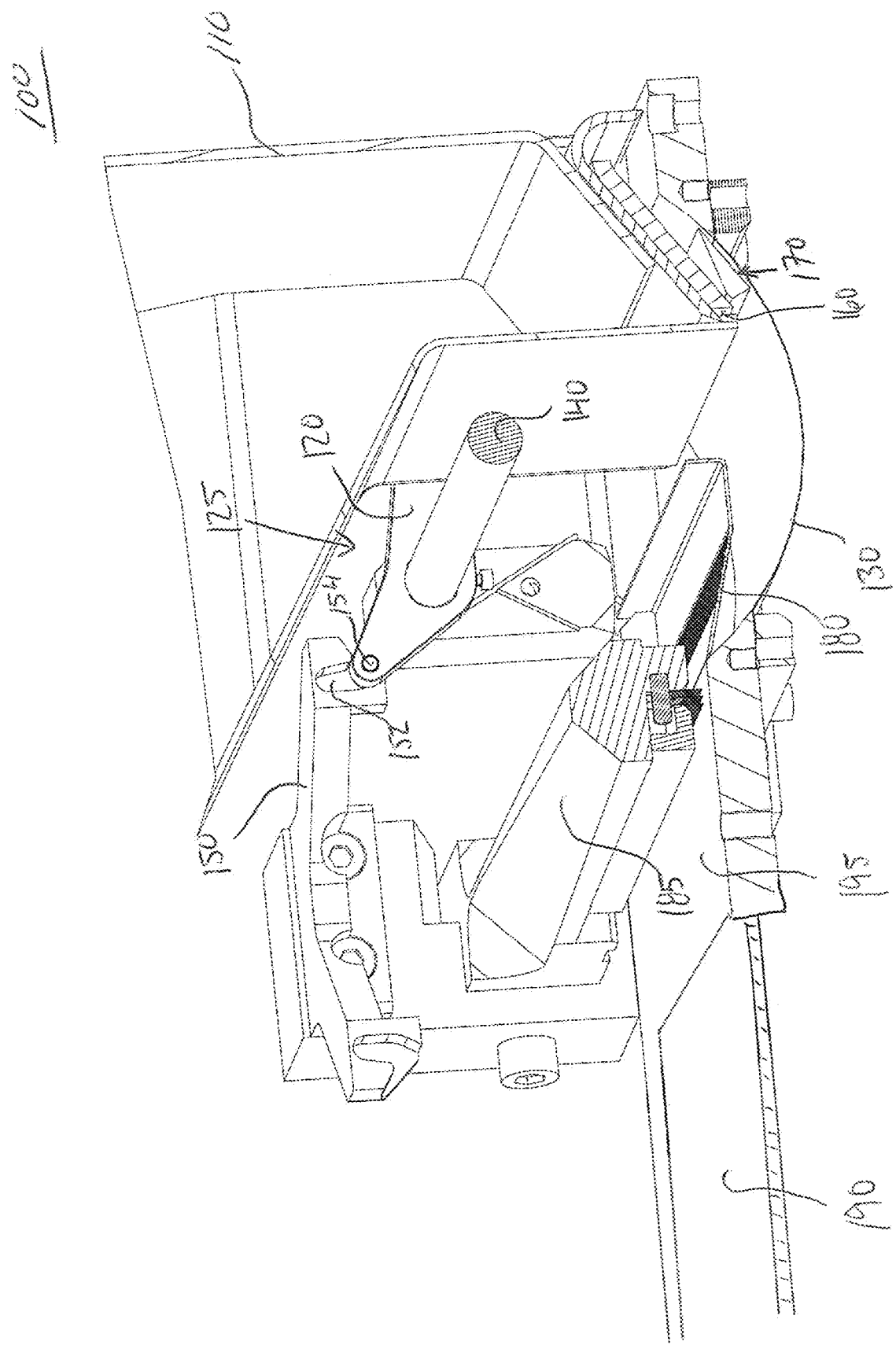
FIG. 1B depicts in a schematic front left cross-sectional view, an example embodiment of the invention where a pivoted powder pushing element is in a first end position.

FIG. 1A depicts in a schematic front left perspective view and FIG. 1b depicts in a schematic front left cross-sectional view of an example embodiment of the invention where a pivoted powder pushing element is in a first end position. In FIG. 1a the rake 185 is in a first position where it is in motion to the right towards the powder storage unit 110.

The pivoted powder pushing device 125 comprises in an example embodiment a first portion 170, an arm 120 and a contact member 154. The pivoted powder pushing device 125 is arranged on a pivot axle 140. The pivot axle 140 may be arranged in the front upper end toward the working area 190. In this first end position the first portion 170 of the pivoted powder pushing device 125 is arranged behind the opening 160 of the powder storage unit 110. Moreover, in the first end position of the first portion 170 the contact member 154 is not affected by a grip arm 150 arranged on the rake 185. The grip arm may be provided with a slot 152 arranged for fitting into the contact member 154. The contact member 154 may in an example embodiment be in the form of a rod attached to the pushing device with a base surface of the rod.

Figure 2A:
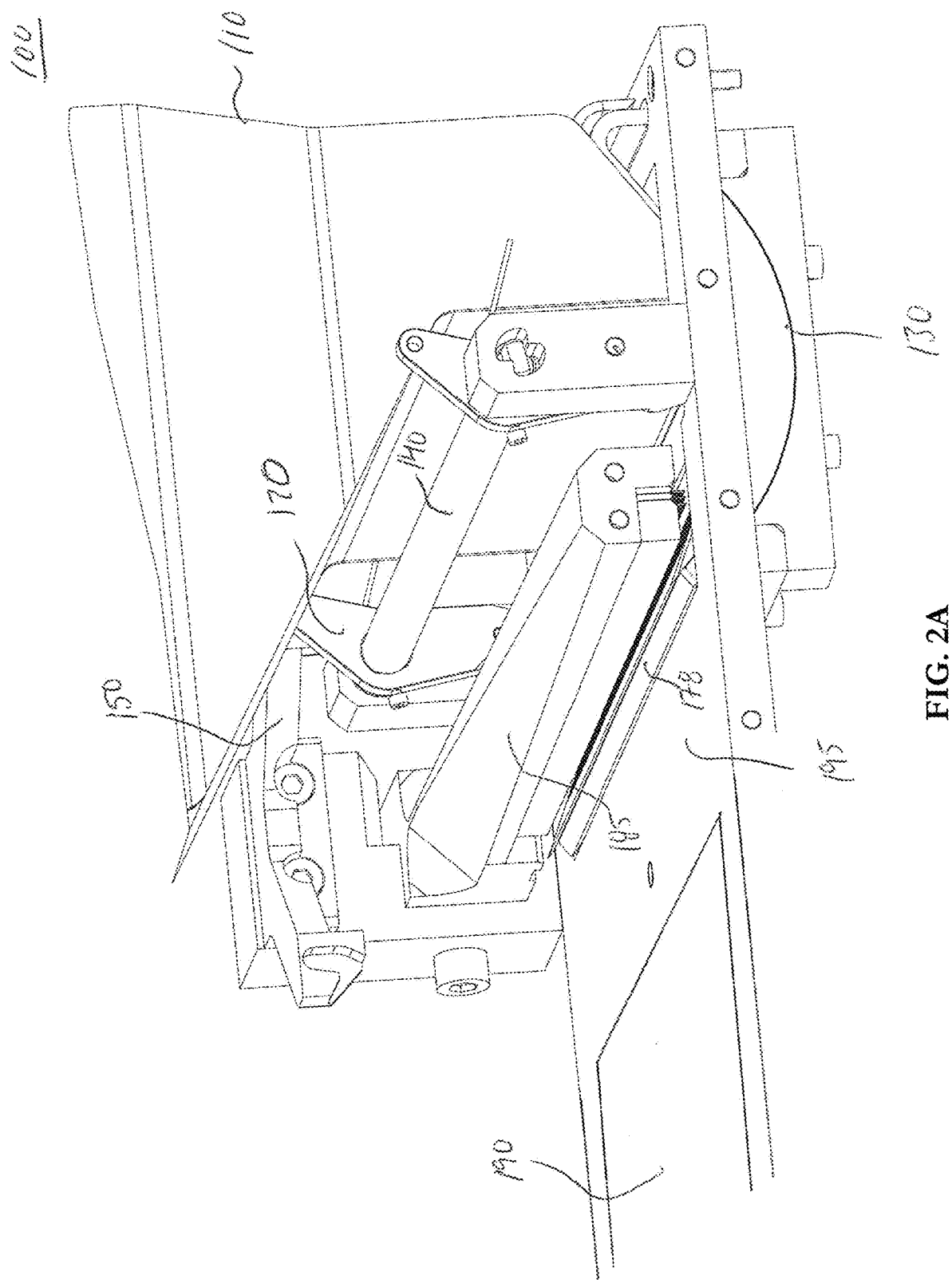
FIG. 2A depicts in a schematic front left perspective view, an example embodiment of the invention where a pivoted powder pushing element is in a second end position.
Figure 2B:
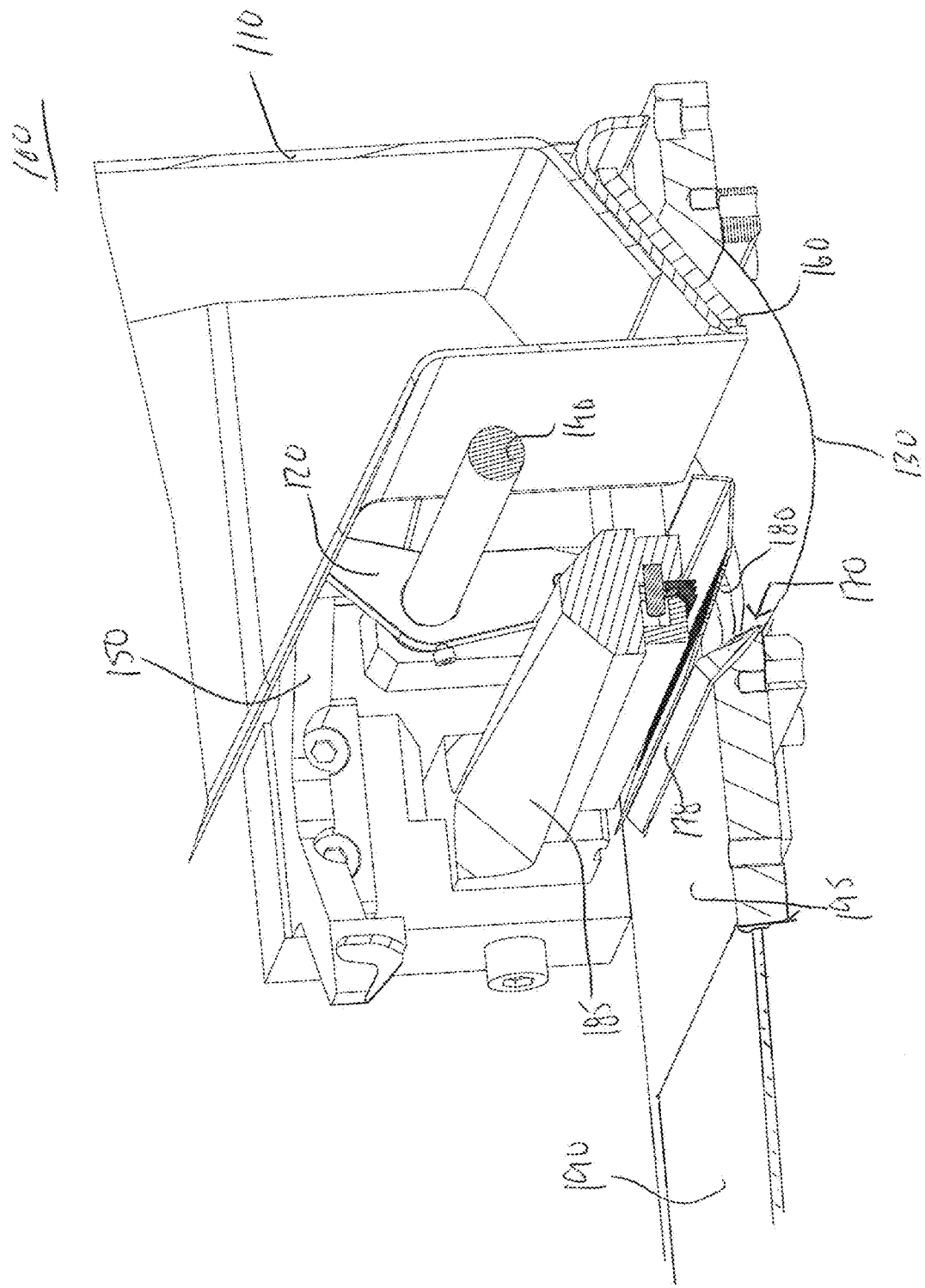
FIG. 2B depicts in a schematic front left cross-sectional view, an example embodiment of the invention where a pivoted powder pushing element is in a second end position.

In FIGS. 2A-B the rake 185 has reached a second position somewhere above the curved base surface 130. The rake 185 is with its grip arm 150 mechanically contacting the contact member 154 of the powder pushing device 125 and has moved the first portion 170 in a forward direction towards the working area 190 to a second end position. As the rake 185 moves in a direction towards the powder storage unit 110 a first portion 170 moves in an opposite direction from the position behind the opening 160 of the powder storage unit 110 towards the working area 190. The first portion 170 is moving in a curved trajectory which may essentially resemble with the curved base surface 130. The curved trajectory of the first portion 170 may have a slightly smaller radius of curvature than the curved base surface 130. The curvature of the base surface 130 is bent downwardly with respect to the powder storage unit 110.

The first portion 170 may be moving at a predetermined distance from the curved base surface 130. As the first portion 170 is moving towards the working area 190 a predetermined amount of powder is pushed in front of the first portion 170 to be delivered on the working table 195.

The pivoted powder pushing device 125 may be electrically actuated and controlled by a control unit instead of as disclosed above be mechanically actuated by the rake 185. The electrical actuation may be triggered by a first position of the rake so that the pivoted motion of the first portion 170 starts when the rake is passing a predetermined position. The return stroke of the first portion may be triggered by a second position of the rake or after a certain time period when the rake was passing the first position.

When the rake 185 is forcing the first portion 170 in a forward direction towards the working area 190 the rake 185 is moving towards the powder storage unit 110. The first portion 170 will pass below the rake 185.

The pivoted powder pushing device 125 may interrupt powder flow from the powder storage unit 110 onto the curved base surface 130 during a portion of its pivoted stroke. In FIG. 1b the first portion 170 is positioned behind the opening 160 of the powder storage unit 110. As the first portion 170 starts to move in a direction towards the working area 190, the first portion 170 will pass below the opening 160 of the powder storage unit 110. The powder flow from the powder storage unit 110 may be arranged to be interrupted when the first portion is arranged below the opening 160. By a suitable design of the size of the first portion 170 and a length of the stroke of the portion 170 the interruption of powder flow may be a minor or major part of the total stroke.

A net 180 may be provided above the curved base surface 130. The net 180 will prohibit any powder agglomerates and/or metal flakes to mix with the powder material as the rake 185 is moved above the curved base surface 130. Surplus powder material is allowed to fall down through the net 180 but powder agglomerates and/or metal flakes will stay on the net 180. The powder distribution mechanism according to the embodiment depicted in FIGS. 1A-B and 2A-B has little or no powder spill. Surplus powder from a powder distribution cycle in which a powder layer is applied onto the working table will fall down through the net 180 and used in a later powder distribution cycle.

By the inventive method the rake 185 does not have to contact the powder material before starting to deliver the material on top of the work table 190. The amount of powder that will be transferred onto the working area 190 is generally dependent on the shape of the first portion 170 and the length of a stroke of the first portion. The larger a front area 178 of the first portion the more material will be transferred to the working area 190. The longer the stroke the more material will be transferred to the working area 190. A front area angle with respect to a line orthogonal to the concave base surface 130 will also affect the amount of powder transferred to the working are. A mean value of the front area angle for a full stroke of the first portion 170 as close to 90° will most efficiently transfer powder from the concave base surface 130 to the working table 195.

The first portion 170 may be shaped like a wedge so that the front area 178 is pushing powder in front of the first portion when moving the first portion in the direction towards the working area 190. During a return stroke, i.e., when the first portion 170 is moving towards the powder storage unit 110, the wedge formed shape of the first portion 170 will ensure as little as possible powder transport in a direction in parallel with the pivoted return stroke. This means that powder is pushed in front of the first portion 170 only when the first portion is moving towards the working area 190 and not when the first portion 170 is moving in the opposite direction, i.e., towards the powder storage unit 110.

Figure 3:
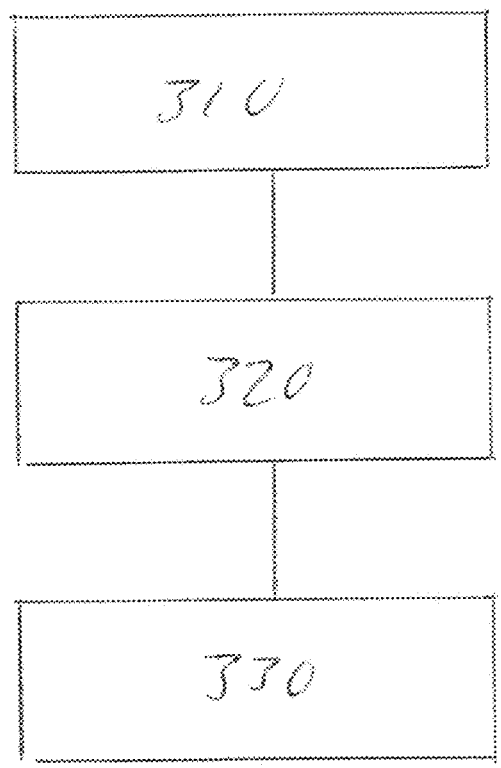
FIG. 3 depicts a schematic flow chart of an example embodiment of the method according to the present invention.

In FIG. 3 it is depicted a schematic flow chart of a method for producing a three-dimensional article layer by layer using a powdery material which can be solidified by irradiating it with an energy beam, such as electromagnetic radiation or an electron beam according to various example embodiments of the present invention.

In a first step 310 a powder storage unit comprising an opening spaced apart from a base surface is provided, where the base surface is supporting a supply of powder in the powder storage unit. The opening towards the base surface may be in the form of a single elongated slit extending along a side of the working area 190.

In a second step 320 a predetermined amount of powder is transported from the base surface to a position between the distribution member and the working area with a pivoted powder pushing device, wherein a portion of the pivoted powder pushing device is movable under the distribution member. During the movement of the powder from the base surface onto the working table 195 a first portion 170 of the powder pushing device is moving beneath the rake/powder distribution member 185. The rake 185 is moving in a plan in parallel with and at a predetermined distance from the working table 195. However, the first portion is having a curved trajectory. This means that the rake 185 may pass above the first portion 170, when the first portion 170 is at a predetermined distance from its end positions of its curved stroke.

In a third step 330 the distribution member is moving towards and across the working area 190 so as to distribute the portion of powder onto the working area 190 for forming a layer of powder material. The powder material provided on the working table 195 by the first portion 170 may be sufficient for providing a complete powder layer with a predetermined thickness onto the working area.

The first portion 170 may be mechanically actuated by the rake 185. In another example embodiment the first portion is electrically actuated. The actuation may be triggered by the position and/or the timing of the rake 185. Accordingly, the volume of powder may be controlled in a more exact manner with the present invention.

In another aspect of the invention it is provided a program element configured and arranged when executed on a computer to implement a method for forming at least one three-dimensional article through successive fusion of parts of a powder bed, which parts correspond to successive portions of the three-dimensional article. The program element may specifically be configured to perform the steps as outlined in the claim set provided herein.

The program element may be installed in one or more non-transitory computer readable storage mediums. The non-transitory computer readable storage mediums and/or the program element may be the control unit 150 or another control unit. The computer readable storage mediums and the program elements, which may comprise non-transitory computer-readable program code portions embodied therein, may further be contained within one or more non-transitory computer program products. According to various embodiments, the method described elsewhere herein may be computer-implemented, for example in conjunction with one or more processors and/or memory storage areas. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 4:
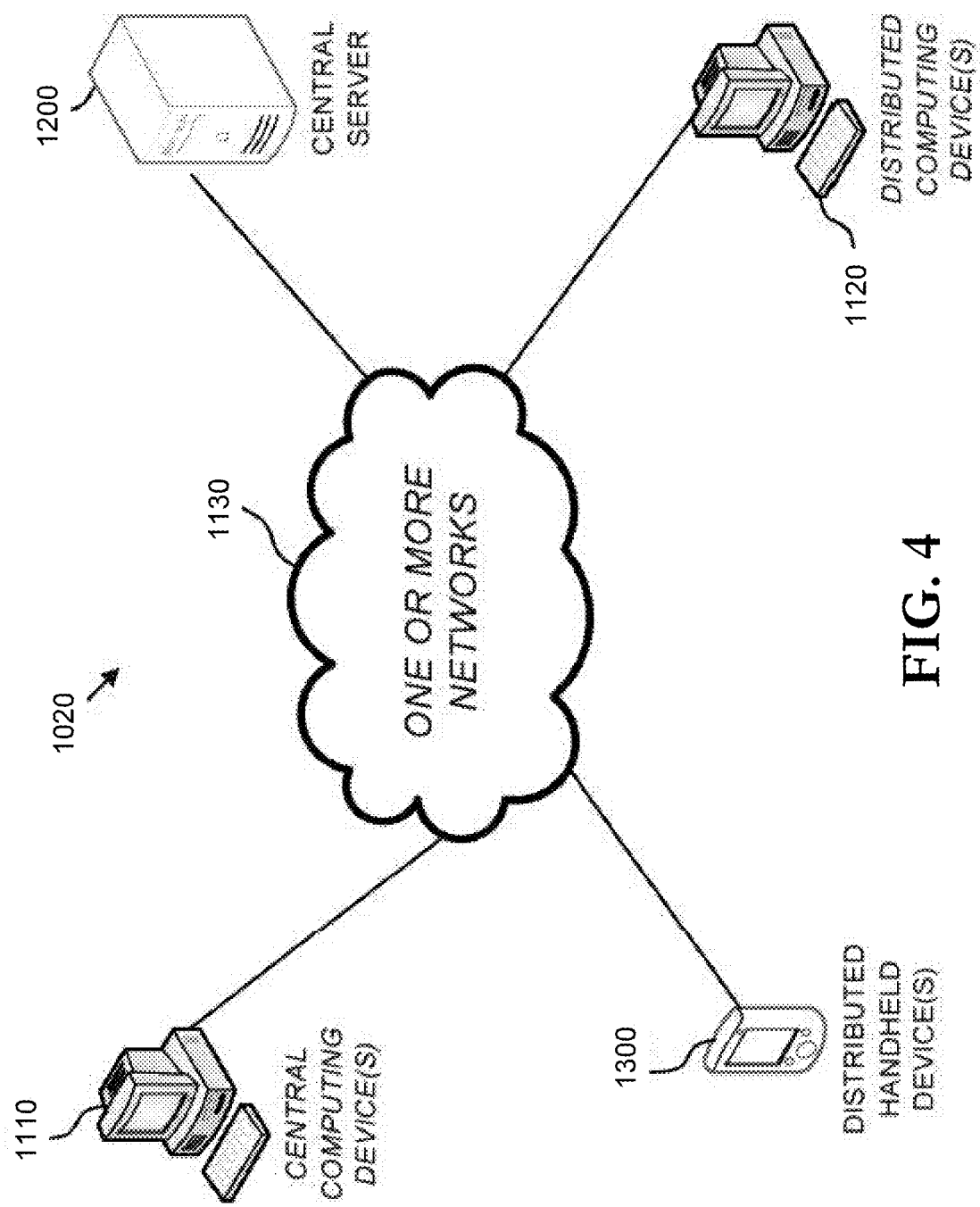
FIG. 4 is a block diagram of an exemplary system according to various embodiments of the present invention.

FIG. 4 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 4 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1020 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 4 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 5A:
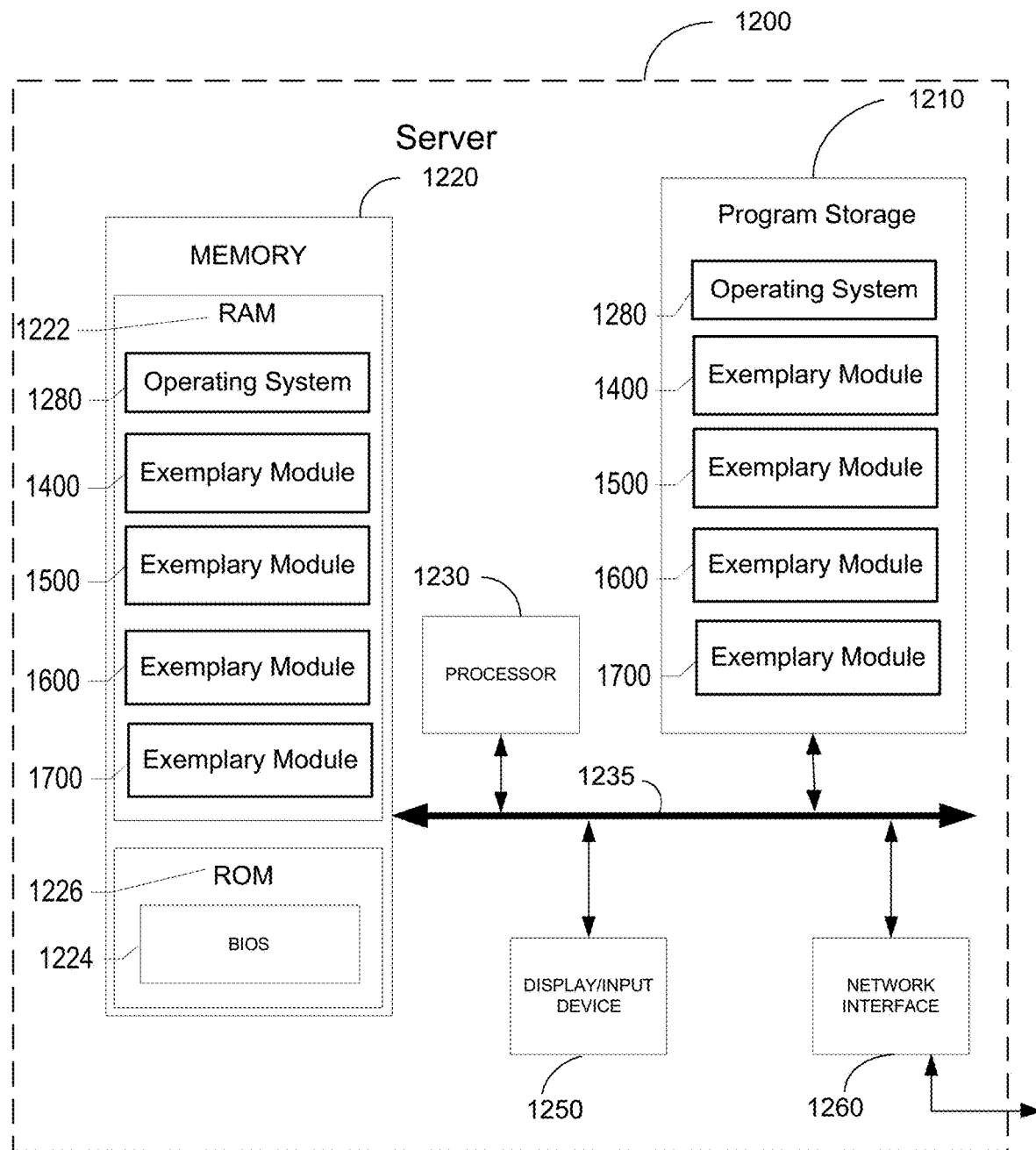
FIG. 5A is a schematic block diagram of a server according to various embodiments of the present invention.

FIG. 5A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 5B:
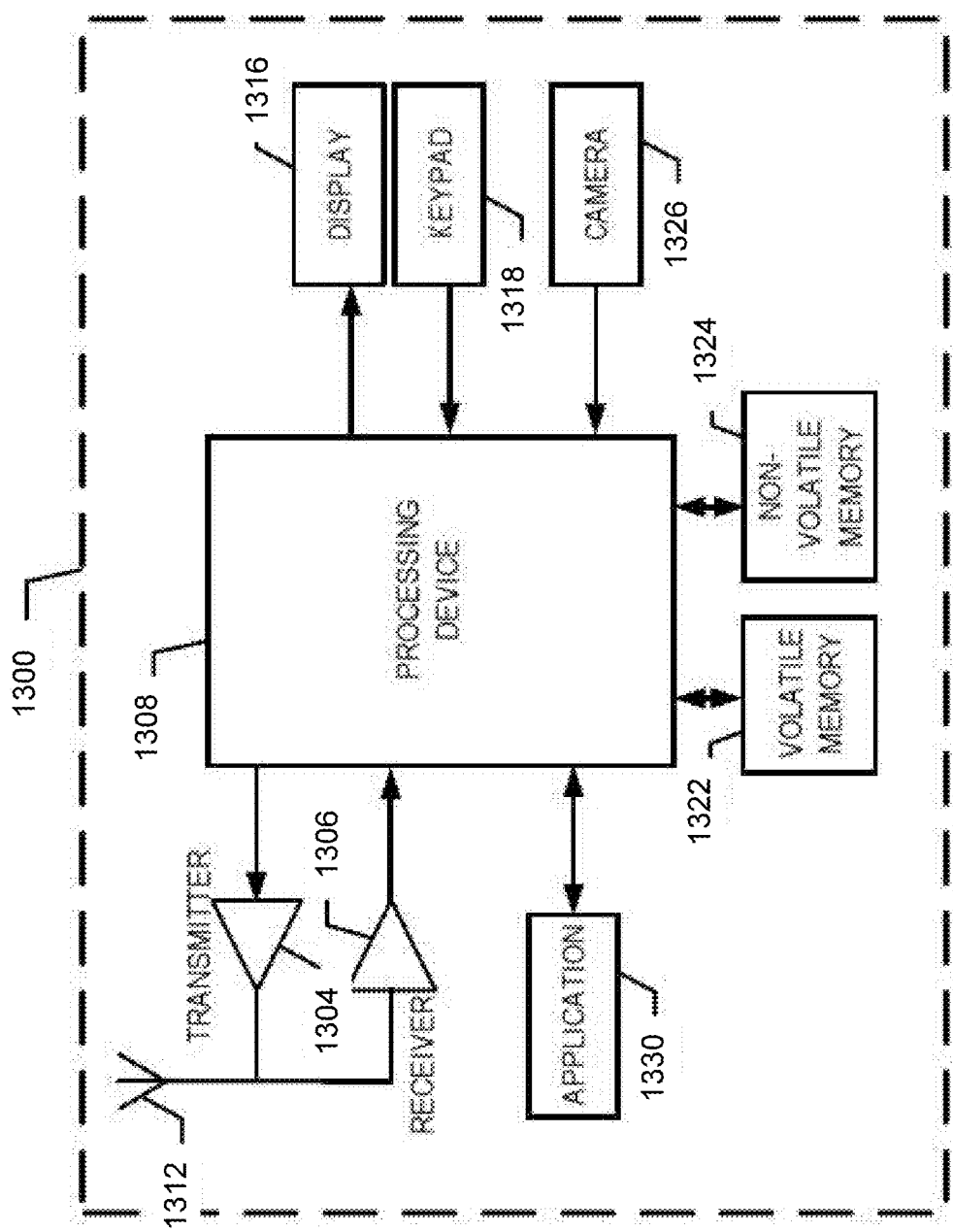
FIG. 5B is a schematic block diagram of an exemplary mobile device according to various embodiments of the present invention.

FIG. 5B provides an illustrative schematic representative of a mobile device 1300 that can be used in conjunction with various embodiments of the present invention. Mobile devices 1300 can be operated by various parties. As shown in FIG. 5B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. For instance the apparatus may comprise a first and a second powder storage unit comprising a first base surface and a second base surface respectively for supporting supply of powder from the first and second powder storage units, the first and second powder storage units are arranged on opposite ends of the working area. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A pivoted powder pushing device (125) for bringing a portion of powder from a base surface (130) of an apparatus (100) for producing a three-dimensional object layer by layer using a powdery material which can be solidified by irradiation thereof with an energy beam and to a position between a distribution member (185) and a working area (190) of said apparatus, said pivoted powder pushing device (125) comprising:
   a first portion (170), and
   a contact member (154),
   wherein:
   the contact member (154) is configured to operatively engage a grip arm (150) of the distribution member (185) when the distribution member (185) is positioned at least in part above the base surface (130), and
   the first portion (170) is moved via the engagement of the grip arm (150) and the contact member (154) in a first direction opposite a direction of travel of the distribution member (185), such that the first portion (170) of said pivoted powder pushing device (125) passes under said distribution member (185) and extends above a plane of a working table (195) when positioned between the distribution member (185) and the working area (190).

2. The device according to claim 1, wherein said pivoted powder pushing device (125) is electrically actuated and controlled by a control unit.

3. The device according to claim 1, wherein a pivot axle (140) for said pivoted powder pushing device (125) is provided above said base surface (130).

4. The device (1) according to claim 1, wherein said pivoted powder pushing device (125) interrupts powder flow from a powder storage unit (110) onto said base surface (130) during a portion of its pivoted stroke.

5. The device (1) according to claim 1, wherein said base surface (130) has a curved shape.

6. The device (1) according to claim 1, wherein:
   the distribution member (185) is moveable in a translational fashion, and
   the first portion (170) of said pivoted powder pushing device (125) is moveable in a curved trajectory.

7. The device (1) according to claim 1, wherein the contact between the contact member (154) and the grip arm (150) occurs only when the distribution member (185) is positioned over the base surface (130).

8. Apparatus (100) for producing a three-dimensional object layer by layer using a powdery material which can be solidified by irradiating it with an energy beam, said apparatus (100) comprising:

a pivoted powder pushing device (125) for bringing a portion of powder from a base surface (130) of said apparatus to a position between a distribution member (185) of said apparatus and a working area (190) of said apparatus, wherein:

said pivoted powder pushing device (125) comprises a first portion (170) having a front area (178) and a rear area, and a contact member (154), the contact member (154) is configured to operatively engage a grip arm (150) of the distribution member (185) when the distribution member (185) is positioned at least in part above the base surface (130), and the front area (178) and the rear area of the first portion (170) are moved via the engagement of the grip arm (150) and the contact member (154) in a first direction opposite a direction of travel of the distribution member (185), such that the first portion (170) of said pivoted powder pushing device (125) passes under said distribution member (185) and extends above a plane of a working table (195) when positioned between the distribution member (185) and the working area (190).

9. The apparatus according to claim 8, wherein said pivoted powder pushing device (125) is electrically actuated and controlled by a control unit.

10. The apparatus according to claim 8, wherein a pivot axle (140) for said pivoted powder pushing device (125) is provided above said base surface (130).

11. The apparatus according to claim 8, wherein said pivoted powder pushing device (125) interrupts powder flow from a powder storage unit (110) onto said base surface (130) during a portion of its pivoted stroke.

12. The apparatus according to claim 8, wherein said base surface (130) has a curved shape.

13. The apparatus according to claim 8, wherein:

the distribution member (185) is moveable in a translational fashion, and the first portion (170) of said pivoted powder pushing device (125) is moveable in a curved trajectory.

14. The apparatus according to claim 8, wherein the contact between the contact member (154) and the grip arm (150) occurs only when the distribution member (185) is positioned over the base surface (130).

15. A computer-implemented method for producing a three-dimensional article layer by layer using a powdery material which can be solidified by irradiating it with an energy beam, method comprising the steps of:

providing a powder storage unit comprising an opening spaced apart from a base surface, where said base surface is supporting a supply of powder in said powder storage unit;

bringing a predetermined amount of powder from said base surface to a position between said distribution member and said working area with a pivoted powder pushing device; and moving said distribution member towards and across the working area so as to distribute the portion of powder onto the working area for forming a layer of powder material, wherein:

said pivoted powder pushing device (125) comprises a first portion (170), and a contact member (154), the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of said pivoted powder pushing device (125) passes under said distribution member (185) and extends above a plane of a working table (195) when positioned between the distribution member (185) and the working area.

16. A computer program product comprising at least one non-transitory computer-readable storage medium having computer-readable program code portions embodied therein, the computer-readable program code portions comprising at least one executable portion configured for:

providing a powder storage unit comprising an opening spaced apart from a base surface, where said base surface is supporting a supply of powder in said powder storage unit;

bringing a predetermined amount of powder from said base surface to a position between said distribution member and said working area with a pivoted powder pushing device; and moving said distribution member towards and across the working area so as to distribute the portion of powder onto the working area for forming a layer of powder material, wherein:

said pivoted powder pushing device (125) comprises a first portion (170), and a contact member (154), the contact member (154) is configured to operatively engage a grip arm (150) of the distribution member (185) when the distribution member (185) is positioned at least in part above the base surface (130), and the first portion (170) is moved via the engagement of the grip arm (150) and the contact member (154) in a first direction opposite a direction of travel of the distribution member (185), such that the first portion (170) of said pivoted powder pushing device (125) passes under said distribution member (185) and extends above a plane of a working table (195) when positioned between the distribution member (185) and the working area.

17. The device (1) according to claim 1, wherein the first portion (170) is configured to inhibit transport of powder in the direction of travel of the distribution member (185) when moving in the first direction.

18. The apparatus according to claim 8, wherein the front area (178) and the rear area of the first portion (170) is shaped such that powder is moved in the first direction opposite the direction of travel of the distribution member (185) in response to movement of the first portion (170).

* * * * *